Sept. 20, 1949.  H. SAMMONS  2,482,720
PREVENTION OF ICE FORMATION IN AIR INTAKES
ON AIRCRAFT AND OTHER FAST MOVING VEHICLES
Filed Feb. 13, 1948  2 Sheets-Sheet 1
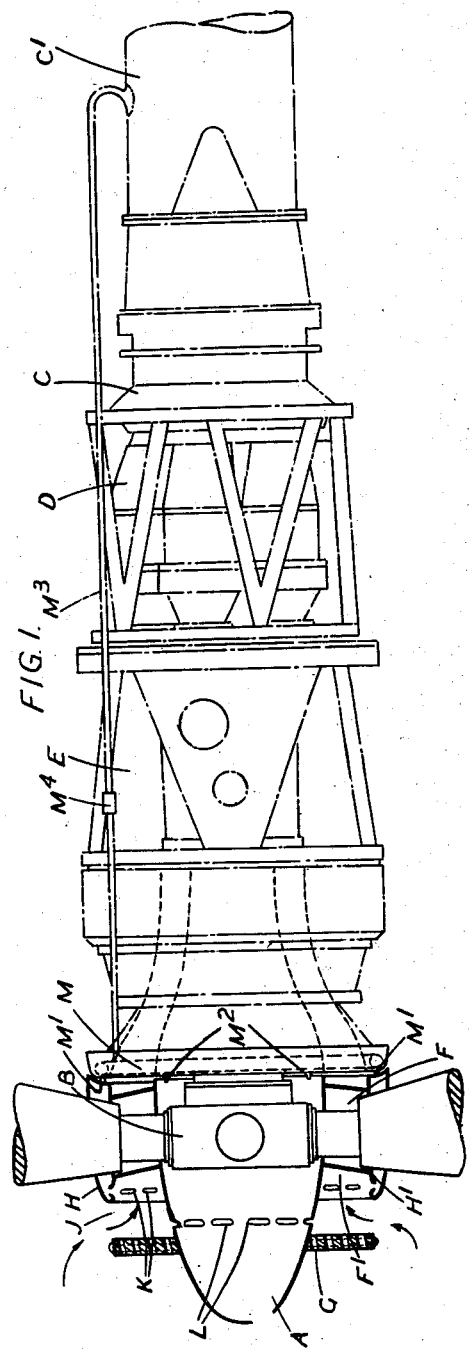
Inventor
Herbert Sammons
By Emery, Holcombe & Blair
Attorneys

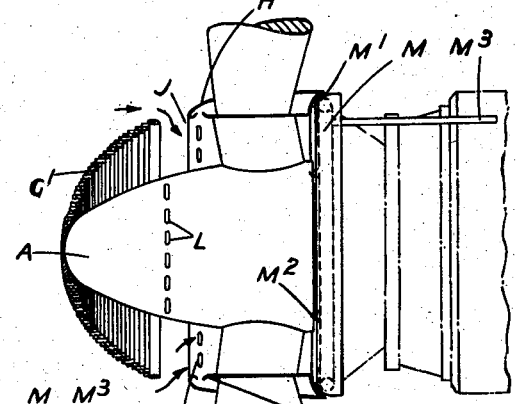
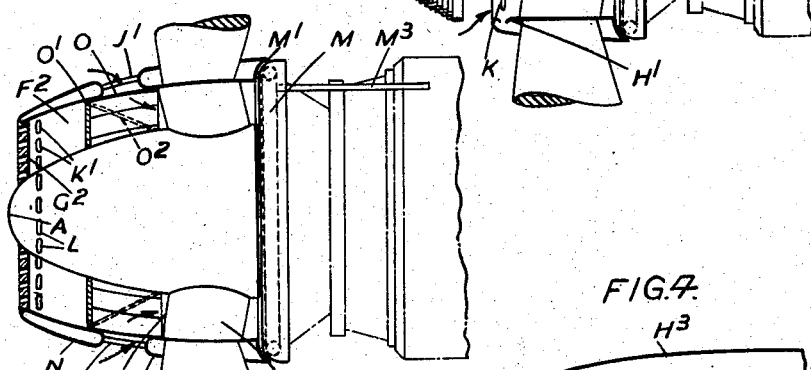
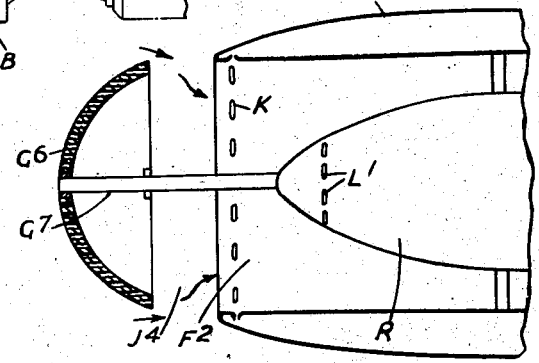

Patented Sept. 20, 1949

2,482,720

UNITED STATES PATENT OFFICE 2,482,720

PREVENTION OF ICE FORMATION IN AIR INTAKES ON AIRCRAFT AND OTHER FAST-MOVING VEHICLES

Herbert Sammons, Gerrards Cross, England, assignor to D. Napier & Son Limited, London, England, a company of Great Britain Application February 13, 1948, Serial No. 8,165
In Great Britain January 13, 1947

Section 1, Public Law 690, August 8, 1946

5 Claims. (Cl. 244—134)

This invention relates to means for preventing ice particles from being formed in and carried with the air into the air intake of the propulsion apparatus of an aircraft or other fast moving vehicle, and is particularly but not exclusively applicable to the air intake of a gas turbine propulsive apparatus or of an internal combustion engine as used for the propulsion of aircraft.

It is known more particularly in aircraft that under certain atmospheric conditions, usually referred to as icing conditions, ice tends to form and build up on any part on which the air impinges, this ice formation being due to small particles of water in the atmosphere turning to ice as they impinge on such parts. Such ice may obstruct the free flow of air over the aircraft or the correct operation of moving parts and damage may be caused, for example by ice breaking away and being carried sometimes in comparatively large pieces into the apparatus to which flows the air entering the intake.

To prevent the entry of pieces of ice or other foreign matter into an air intake it has been proposed to mount in front of the intake and at a fixed distance therefrom a flat grid-like structure. Such a grid however under icing conditions does not prevent the formation of ice in the air intake or wholly stop the passage of particles of ice into the intake.

According to this invention in propulsive apparatus of the type referred to and for the purpose indicated there is combined with the intake for air flowing for example to a compressor, a structure constituting a guard which is positioned in front of the air intake and tends to prevent ice from being carried directly into the intake, and means for supplying hot air or other gas and for delivering it, for instance in jets, into the air which flows past the guard into the intake. The structure constituting the guard advantageously may be pervious so that until it is iced-up air can flow through it, and so arranged that the air as it flows past the guard into the intake can either flow direct or may follow a path which is sinuous. The air will follow such a path when a pervious guard is iced up. The guard structure may be mounted on and rotate with a spinner or the hub of a propeller or it may be non-rotatable.

Where the structure constituting the guard is of a pervious nature so that until the guard is iced-up air can flow directly through it into an annular intake, the air when its flow through the guard is obstructed will flow over the guard and then inwards through an annular opening between the guard and the mouth of the main intake, and the flow through this opening may be controlled by a valve structure such as flaps or the like.

In any one of the above indicated arrangements in accordance with this invention there are orifices in a hollow casing forming a wall of the mouth of the air intake with means for delivering heated air or other gas in jets through these orifices so that these jets are directed into the air entering the intake. Where the guard structure is mounted on a spinner or propeller hub and the air as it flows into the annular intake can pass through the guard until this is iced-up and then over it and through an annular opening around the guard, orifices are arranged in the spinner or the part on which the guard is mounted and means are provided for delivering jets of heated air or other gas through these orifices so that these jets will be directed radially outwards into the air flowing past the guard structure into the air intake. Jets of hot air or other gas may be delivered as above indicated both radially inwards and also radially outwards into the stream of air flowing into the intake.

It will be understood that in any one of the arrangements in accordance with this invention as indicated above under icing conditions the direct passage of particles of ice into the air intake is prevented by the action of the guard in that it deflects the air stream in such a manner that particles of ice will be thrown clear of the annular opening behind the guard through which the air can only enter after its flow has been deflected inwards. The guard performs its function automatically in the case where it is pervious in that it permits the free and direct passage of air to the intake until icing conditions obstruct this direct air flow.

In any case whether the guard is pervious or impervious the delivery of hot air or other gas into the air flowing into the intake, either constantly or if desired only under icing conditions, will tend to melt such small particles of ice as may not be thrown off but carried inwards into the intake and in this way prevent damage being caused by ice particles in the air stream.

The accompanying drawings illustrate by way of example alternative constructions and arrangements that may be employed in carrying the invention into practice. In these drawings, Figure 1 is a somewhat diagrammatic side elevation partially in section along a longitudinal axis of a gas turbine propulsion apparatus for an aircraft of the type in which propulsion is partially or wholly effected by a propeller, the air intake for the compressor in the apparatus being annular and through a casing mounted on the spinner. This view shows one form of a pervious guard such as may be mounted on the spinner in front of the air intake.

Figure 2 is a vertical section along a longitudinal axis of the fore part of a propulsion apparatus of the same type in which a pervious guard having a different form is used.

Figure 3 is a similar view showing an alternative structure and arrangement of a pervious guard on the spinner in conjunction with means for controlling the air flow past the guard and into the air intake when flow through the guard is obstructed by ice.

Figure 4 is a view similar to Figs. 2 and 3 showing one arrangement of a pervious guard which may be employed in conjunction with a cylindrical intake opening as distinct from the annular intake openings in the constructions illustrated in the above mentioned figures.

Referring to Figure 1, the spinner A of ordinary known construction is mounted on or connected to the hub B of the propeller so that it rotates therewith. The propeller is driven in a known manner by a turbine enclosed in a casing C, the turbine being propelled by the products of combustion from combustion chambers situated at D, air for combustion being delivered into these chambers by a compressor located at E and driven by the turbine, the air flowing to this compressor through an annular passage F having an inlet opening at $F^1$ around the spinner A and in advance of the propeller hub B. In front of the annular air intake $F^1$ there is mounted on the spinner A a guard G which in this case is in the form of an annular perforated plate structure through which air can flow directly to the intake opening $F^1$ so long as the openings through the guard G are not obstructed by ice. Between the casing H which forms the outer wall of the inlet opening $F^1$ and the periphery of the guard plate G is an annular gap J through which air can flow in the manner indicated by the arrows over the edge of the guard plate G and into the intake opening $F^1$ when the guard plate G is iced-up so that air can no longer flow directly through it.

In the inner wall $H^1$ of the hollow casing H around the annular air intake are formed a series of openings K through which hot air or gas can issue into the air flowing into the air intake $F^1$. A series of similar openings L are formed in the wall of the spinner A just at the rear of the guard plate G and hot air can issue from these openings L into the intake $F^1$. Hot air or gas may be supplied to the delivery nozzles K and L in various ways, one way being illustrated for example in Figure 1. Here there is arranged at the rear of the spinner A an annular manifold M provided with jet nozzles $M^1$ delivering into the interior of the casing $HH^1$ and jet nozzles $M^2$ which deliver into the interior of the spinner A. Hot gas tapped off from the exhaust passage $C^1$ through which the gases flow from the turbine are led through piping $M^3$ to the manifold M. In this piping is a valve $M^4$ which may be operated manually or automatically in accordance with temperature and serves to control the flow of hot gases through the orifices K and L into the air flowing to the compressor. In place of tapping the hot gas from the exhaust piping $C^1$, air as delivered by the compressor may be drawn off into the piping $M^3$.

Referring to the arrangement shown in Figure 2, this resembles that described above with reference to Figure 1 except that the guard $G^1$ is here curved so as to offer less air resistance. This guard may conveniently be constituted as shown of a series of slat-like rings of different diameters suitably connected by radial members and spaced apart so that air can flow freely between these slats and thus directly to the air intake opening $F^1$ until the face of the guard $G^1$ is obstructed by the formation of ice. When this has occurred the air flow to the intake $F^1$ is indirect through the annular gap J between the rear edge of the guard and the annular casing H around the intake opening. Hot gas can be delivered through orifices K and L disposed as described in connection with the construction shown in Figure 1, this gas being delivered through piping $M^3$ to a manifold $M^1$ whence the gas is delivered through jet nozzles into the interior of the casing H of the spinner A.

Referring to the construction shown in Figure 3, here also the guard is mounted on the spinner A. In this case there is an annular hollow casing N suitably mounted on the forward end of the spinner A and the guard plate $G^2$ is a flat annulus attached at its inner edge to the spinner A and at its periphery to the hollow casing N. There is thus an annular intake passage $F^2$ through which the air flowing through the pervious guard plate $G^2$ can flow directly to the main annular air intake $F^1$ adjacent to and just in front of the propeller hub B, this intake being formed between the outer wall of the spinner A and the outer hollow casing H. There is an annular gap $J^1$ forming an inlet opening between the rear edge of the casing N and the forward edge of the casing H, and through this gap $J^1$ air which has passed over the casing N can flow into the annular intake $F^1$. The gap $J^1$ can be closed by a series of flap valves O pivoted at $O^1$ on the inside of the casing N and at its rear end. These flap valves O when in the position in which they are shown in full lines in Figure 3 leave the annular intake $F^2$ open for the inflow of air but close the annular intake $J^1$, the valves being in this position when the normal air flow can take place through the guard plate $G^2$. When however the air flow through this plate is obstructed by ice the valves O are moved to the position indicated in dotted lines at $O^2$, thus opening the annular intake $J^1$ through which the air flow will then take place.

In this construction hot gas can be delivered to the jet orifices L in the spinner and through jet orifices $K^1$ in the inner wall of the annular hollow casing N. Hot gas is delivered from the manifold M through jet nozzles $M^1$ into the interior of the casing H whence these gases can flow through piping $N^1$ into the interior of the annular casing N. Hot gas from the manifold M can also flow through the nozzles $M^2$ into the interior of the spinner A, the gas issuing then through the orifices L. The hot gas will thus be delivered both in outwardly and inwardly directed jets into the air stream flowing through the guard plate $G^2$ and the annular intake $F^2$.

Figure 4 shows an arrangement for the guard member in conjunction with a cylindrical air intake opening $F^2$. The guard $G^3$ in this case is conveniently of a pervious structure so that until it is iced-up air can flow directly through the guard into the intake opening $F^2$. If however the face of the guard is iced-up the air must then flow over the guard and in through the annular intake opening $J^4$. The guard $G^6$ is carried through a rod or like member $G^7$ by a torpedo-shaped structure R disposed within the cylindrical air intake $F^2$. This arrangement is suitable for use in the case of the air intake to a jet propulsion apparatus having no propeller. A hollow casing $H^3$ surrounds the intake $F^2$ and hot gas can be supplied to the interior of this casing in the manner described above, the gas issuing through orifices K and being directed inwardly into the entering air stream. Orifices $L^1$ in the hollow structure R enable jets of hot gas to be delivered outwardly into the entering air stream.

What I claim as my invention and desire to secure by Letters Patent is:

1. Apparatus for preventing ice particles from being carried by air flowing into the air intake in propulsion apparatus of the type indicated comprising in combination a main air intake passage leading to the propulsion apparatus, a pervious structure constituting a guard positioned in front of the opening into the air intake and through which air can flow directly into the intake until the passages through the guard are iced up and the direct air flow is obstructed, an annular intake opening behind the guard through which air can flow into the said main intake passage when the flow through the said guard is obstructed, and means for delivering hot gas into the air which flows past the said guard structure into the intake.

2. Apparatus for preventing ice particles from being carried by air flowing into the air intake in propulsion apparatus of the type indicated comprising in combination a main air intake passage leading to the propulsion apparatus, a pervious structure constituting a guard positioned in front of the opening into the air intake passage and serving to prevent ice particles from being carried directly into the intake, an annular intake opening behind the said guard and leading into the said main air intake passage, means including a valve structure for controlling the air flow past the guard and into the said annular intake opening behind the guard, and means for delivering hot gas into the air which flows into the said main air intake passage.

3. Apparatus as set forth in claim 1 wherein the air intake passage is annular and the means for delivering hot gases into the air comprise a series of radical openings in at least one of the walls bounding said intake passage.

4. Apparatus as set forth in claim 2 wherein the air intake passage is annular, and the means for delivering hot gases into the air comprise a series of openings in at least one of the walls bounding said air intake.

5. Apparatus for preventing ice particles from being carried by air flowing into the intake in propulsion apparatus of the character described comprising in combination a main air intake passage leading to the propulsion apparatus, said intake passage having an inlet opening at its front end, a pervious guard member positioned in front of said opening to deflect ice particles therefrom, said guard being spaced from said opening to provide a circumferential channel communicating with said passage, said channel providing for flow of air into said main intake passage around said pervious guard, and means adjacent to said pervious guard for delivering hot gas into the air flowing through said guard before entering said intake passage.

HERBERT SAMMONS.

REFERENCES CITED

The following references are of record in the file of this patent:

UNITED STATES PATENTS

| Number | Name | Date |
|---|---|---|
| 2,365,328 | Bell | Dec. 19, 1944 |
| 2,389,313 | Hunter | Nov. 20, 1945 |
| 2,404,275 | Clark et al. | July 16, 1946 |

OTHER REFERENCES

Ser. No. 373,622, Neumann et al. (A. P. C.), published May 25, 1943.